(12) United States Patent
Stalder

(10) Patent No.: US 10,350,843 B2
(45) Date of Patent: Jul. 16, 2019

(54) OPTICALLY EFFECTIVE SURFACE RELIEF MICROSTRUCTURES AND METHOD OF MAKING THEM

(71) Applicant: ROLIC AG, Zug (CH)

(72) Inventor: Martin Stalder, Oberwil (CH)

(73) Assignee: ROLIC AG, Zug (CH)

( * ) Notice: Subject to any disclaimer, the term of this patent is extended or adjusted under 35 U.S.C. 154(b) by 369 days.

(21) Appl. No.: 14/108,453

(22) Filed: Dec. 17, 2013

(65) Prior Publication Data

US 2014/0106091 A1 Apr. 17, 2014

Related U.S. Application Data

(62) Division of application No. 12/297,126, filed as application No. PCT/CH2007/000227 on May 7, 2007, now Pat. No. 8,840,146.

(30) Foreign Application Priority Data

May 12, 2006 (EP) .................................. 06113901

(51) Int. Cl.
*G02B 5/02* (2006.01)
*B29D 11/00* (2006.01)
(Continued)

(52) U.S. Cl.
CPC ........ *B29D 11/00865* (2013.01); *B42D 25/29* (2014.10); *B42D 25/324* (2014.10);
(Continued)

(58) Field of Classification Search
CPC .............. B29D 11/00865; B42D 25/29; G02B 5/0263; G02B 5/0284; G02B 5/0221; G02B 5/0268; G02B 5/0257
(Continued)

(56) References Cited

U.S. PATENT DOCUMENTS 4,329,410 A * 5/1982 Buckley ................... G03F 1/22
378/35
5,084,351 A 1/1992 Philips
(Continued)

FOREIGN PATENT DOCUMENTS

DE 10 2004 003 984 A1 8/2005
EP 0 712 012 A1 5/1996
(Continued)

OTHER PUBLICATIONS

Park et al.; Enabling nanotechnology with self assembled block copolymer patterns; Polymer, Elsevier Science Publishers, vol. 44, No. 22, 2003, pp. 6725-6760.
(Continued)

*Primary Examiner* — Michael P Wieczorek
*Assistant Examiner* — Michael G Miller
(74) *Attorney, Agent, or Firm* — Sughrue Mion, PLLC

(57) ABSTRACT

The present invention relates to an element comprising a surface area with a specific, optically effective surface relief microstructure (12). The surface relief microstructure has a surface modulation of top regions (13) and bottom regions (14), wherein in a first lateral direction of the surface area there is in average at least one transition from a top to a bottom region or vice versa within every 20 micrometer, and in a second lateral direction of the mask, which is perpendicular to the first direction, there is in average at least one transition from a first to a second zone or vice versa within every 200 micrometer. In the microstructure, (i) in the first direction the lateral arrangement of the transitions is non-periodic, and (ii) the top regions substantially lie in the same top relief plateau (15) and the bottom regions substantially lie in the same bottom relief plateau (16).

7 Claims, 14 Drawing Sheets

(51) Int. Cl.
  *B42D 25/29* (2014.01)
  *B42D 25/324* (2014.01)
  *B42D 25/328* (2014.01)
  *B42D 25/445* (2014.01)

(52) U.S. Cl.
  CPC ......... *B42D 25/328* (2014.10); *B42D 25/445* (2014.10); *G02B 5/0221* (2013.01); *G02B 5/0257* (2013.01); *G02B 5/0263* (2013.01); *G02B 5/0268* (2013.01); *G02B 5/0284* (2013.01)

(58) Field of Classification Search
  USPC .................................................. 427/160–169
  See application file for complete search history.

(56) References Cited

U.S. PATENT DOCUMENTS

| | | | |
|---|---|---|---|
| 5,389,698 A | 2/1995 | Chigrinov et al. | |
| 6,322,938 B1 | 11/2001 | Cohn | |
| 6,686,027 B1* | 2/2004 | Caporaletti | B32B 7/02 283/72 |
| 6,686,042 B1 | 2/2004 | Legallee | |
| 6,958,207 B1* | 10/2005 | Khusnatdinov | G02B 1/11 430/321 |
| 2001/0019802 A1* | 9/2001 | Nozaki | G03F 1/00 430/5 |
| 2002/0034710 A1 | 3/2002 | Morris et al. | |
| 2003/0011870 A1 | 1/2003 | Otake et al. | |
| 2003/0072412 A1 | 4/2003 | Martynov et al. | |
| 2004/0067449 A1* | 4/2004 | Dinu | G02B 6/136 430/321 |
| 2004/0076795 A1 | 4/2004 | Shimomura et al. | |
| 2005/0094277 A1 | 5/2005 | Khusnatdinov et al. | |
| 2005/0219353 A1 | 10/2005 | Matsuo et al. | |
| 2005/0287445 A1 | 12/2005 | Liu | |
| 2009/0179418 A1 | 7/2009 | Stalder | |

FOREIGN PATENT DOCUMENTS

| | | | | |
|---|---|---|---|---|
| EP | 0 766 103 A1 | 4/1997 | | |
| JP | 2005-215642 A | 8/2005 | | |
| KR | 2003-0082295 A | 10/2003 | | |
| WO | 01/29148 A1 | 4/2001 | | |
| WO | WO 01/29148 | * 4/2001 | ............. | C09K 19/54 |
| WO | 2004/027500 A1 | 4/2004 | | |
| WO | WO 2004027500 A1 | * 4/2004 | ........... | G02B 5/0221 |
| WO | 2005/008321 A1 | 1/2005 | | |
| WO | 2006/007742 A1 | 1/2006 | | |

OTHER PUBLICATIONS

International Search Report for Application No. PCT/CH2007/000227 dated Jul. 11, 2007, 3 pages.
European Search Report for Applicaiton No. 06 11 3901 dated Feb. 5, 2007, 5 pages.
Ibn-Elhaj et al., Optical polymer thin films with isotropic and anisotropic nano-corrugated surface topologies; Nature, 2001, vol. 410, pp. 796-799.
M.T. Gale; Replication techniques for diffractive optical elements; Microelectronic Engineering, 1997, vol. 34, p. 321-339.
Leech et al., Fabrication of Hologram Coins using Elctron Beam Lithography; Materials Research Society Symp. Proc., vol. 777, 2003, p. T8.5.1-T8.5.6.
Leech et al., Microrelief structures for anti-counterfeiting applications; Microelectronic Engineering, 65, (2003), pp. 439-446.
Martynov et al., Lamellar Multilayer Gratings with Very High Diffraction Efficiency; Proceeding of the SPIE, SPIE, VA, US, vol. 3150, 1997, pp. 2-8.

* cited by examiner

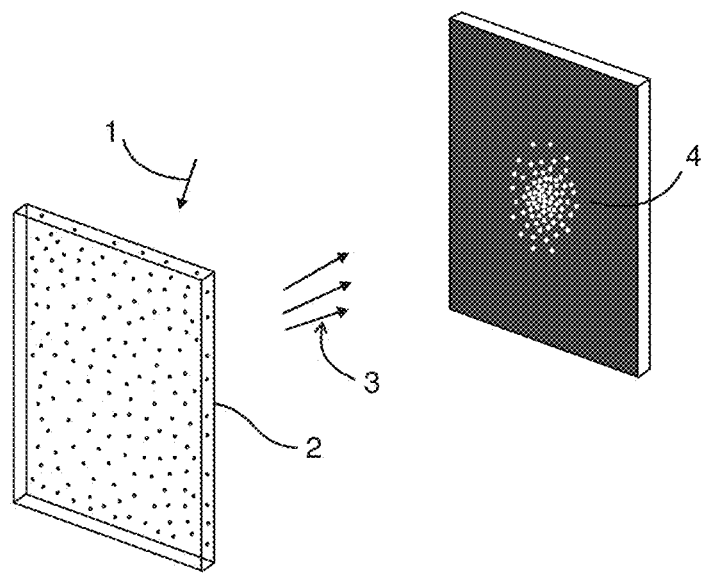
Fig. 1.1
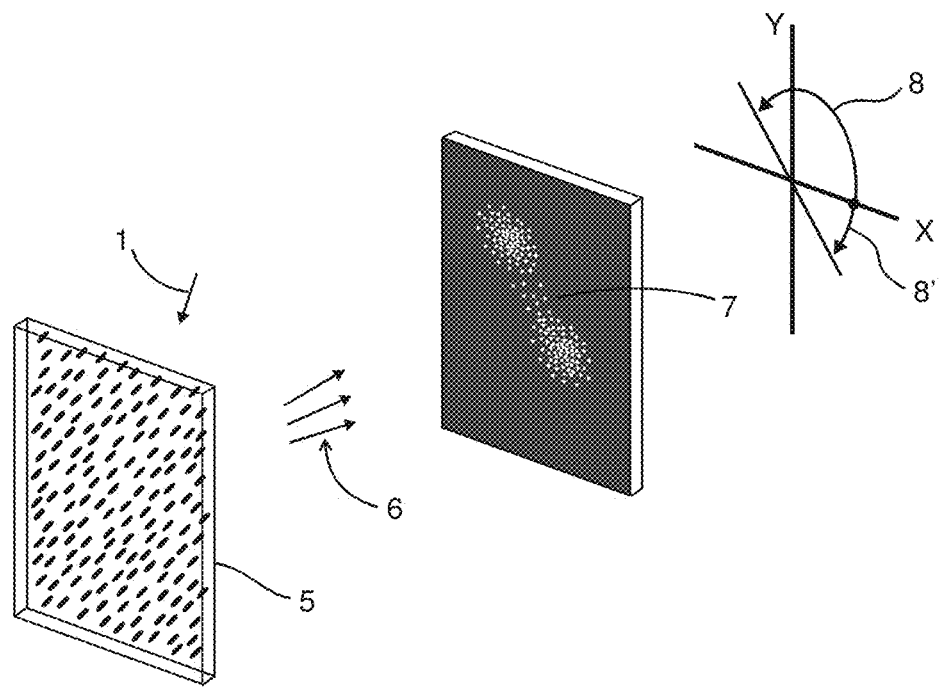
Fig. 1.2

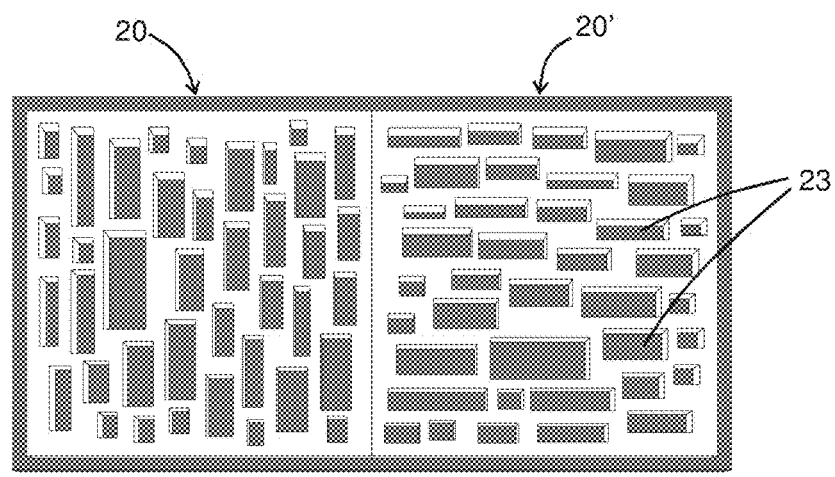
Fig. 4.1
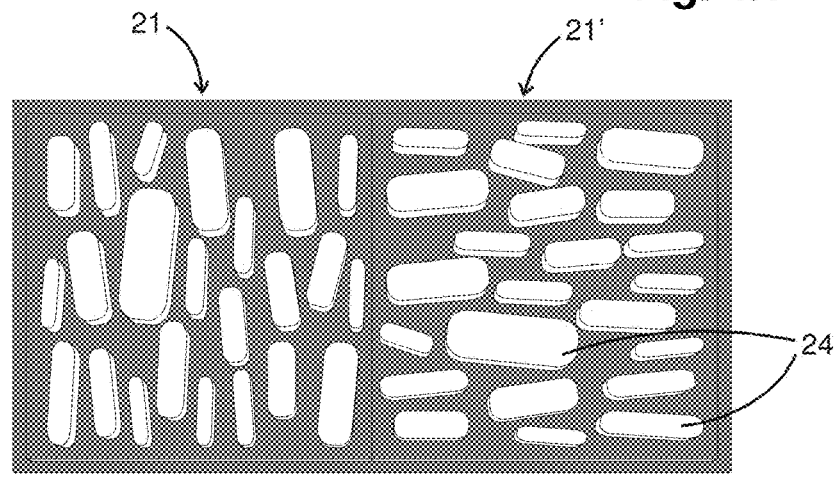
Fig. 4.2
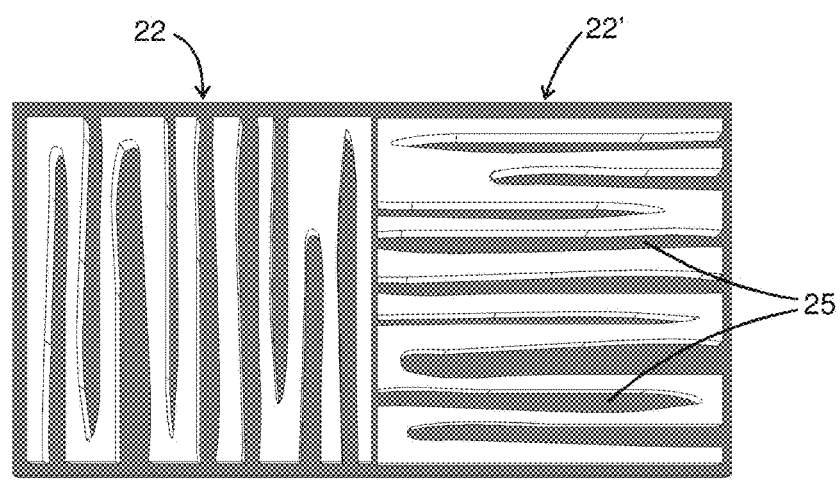
Fig. 4.3

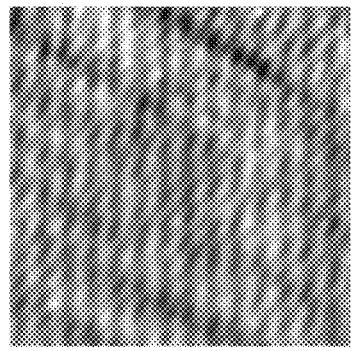
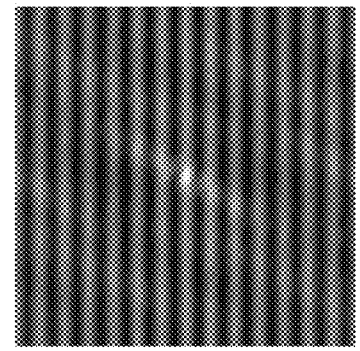
Fig. 5.1 (prior art)    Fig. 5.2 (prior art)
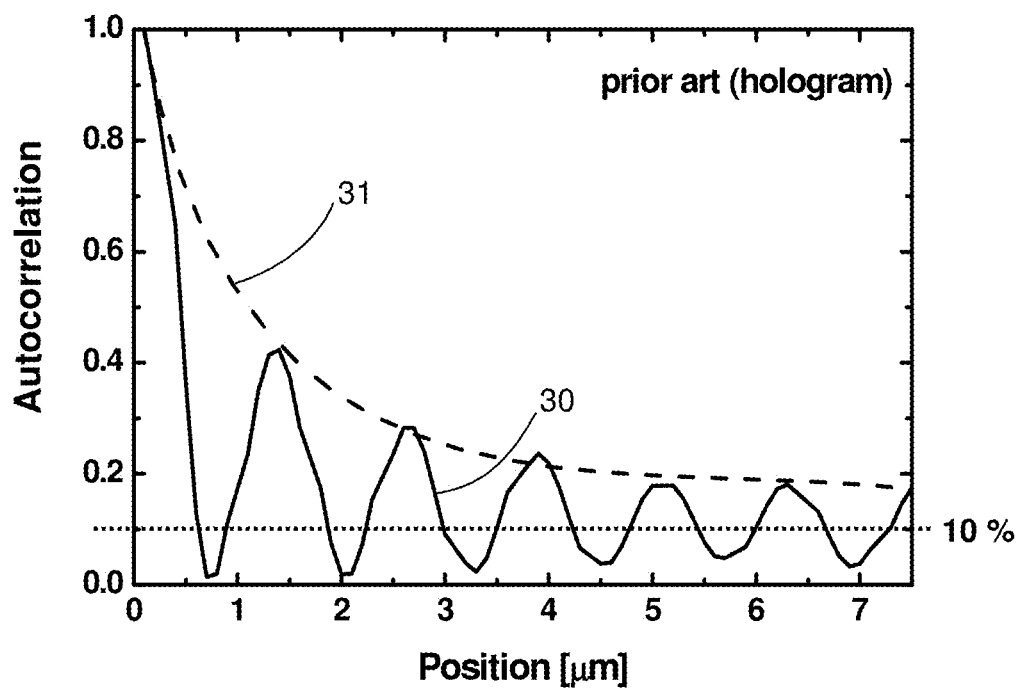
Fig. 5.3 (prior art)

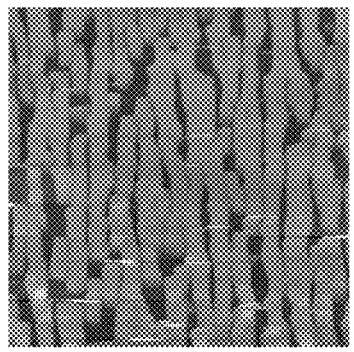
Fig. 6.1
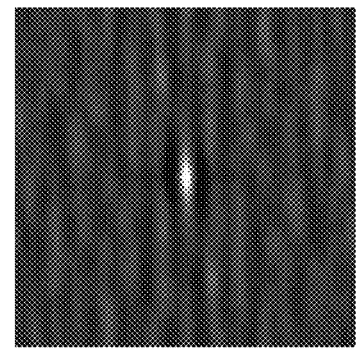
Fig. 6.2
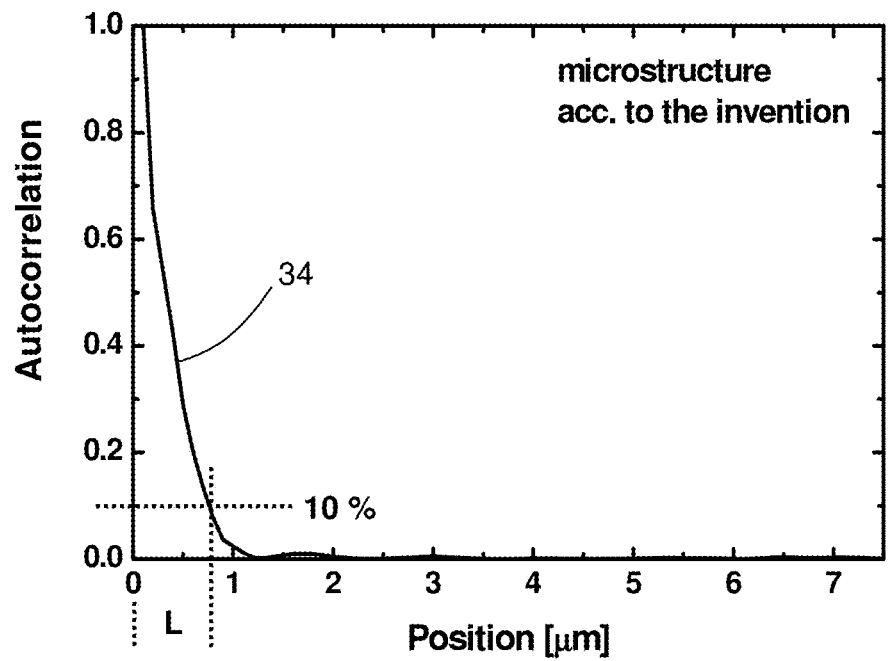
Fig. 6.3

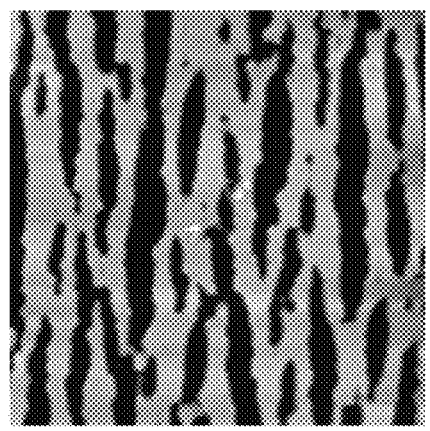
Fig. 7.1
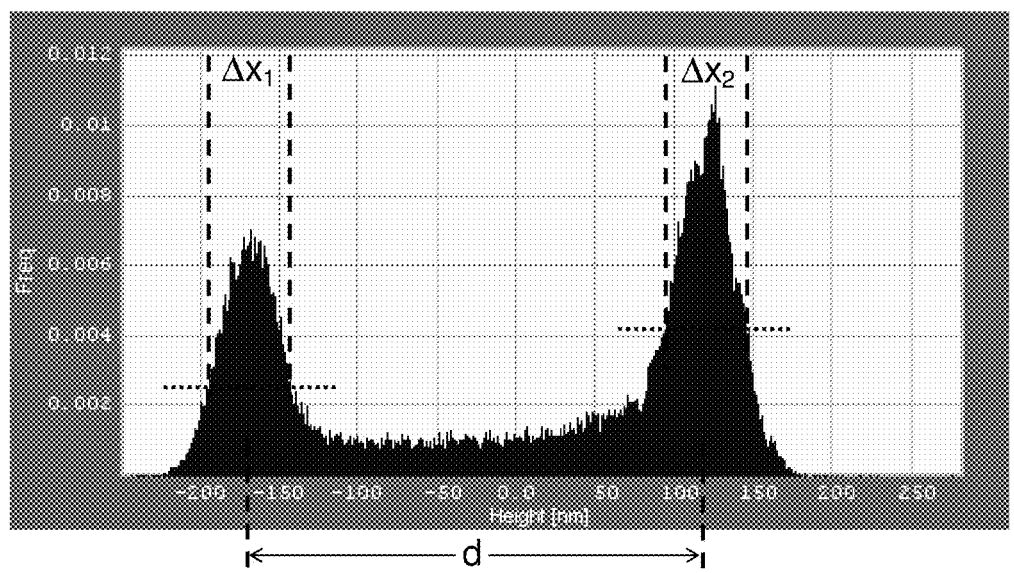
Fig. 7.2

Fig. 8.1
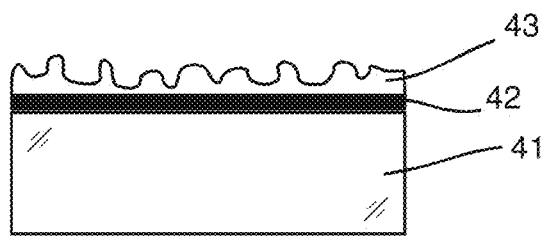
Fig. 8.2
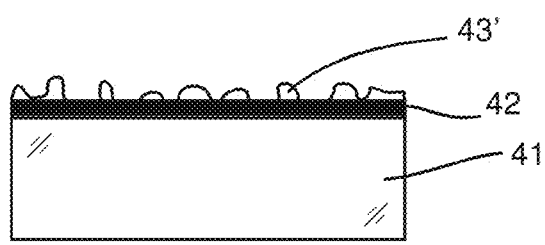
Fig. 8.3
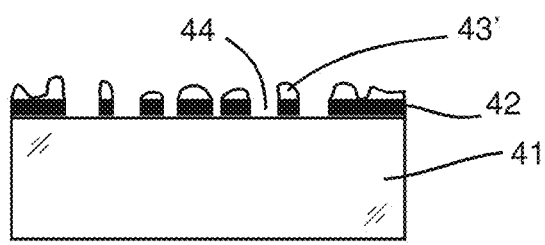
Fig. 8.4
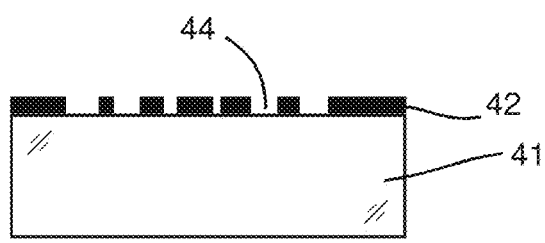
Fig. 8.5

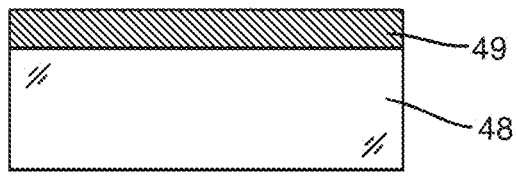
Fig. 9.1
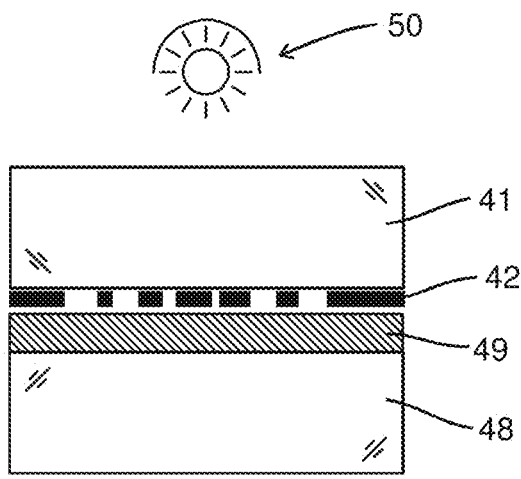
Fig. 9.2
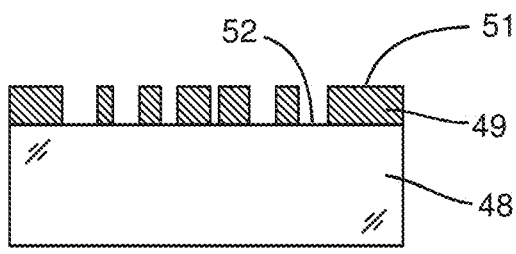
Fig. 9.3

Fig. 10.1
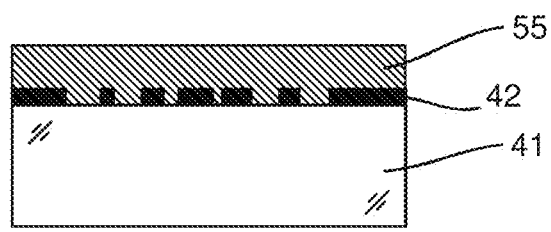
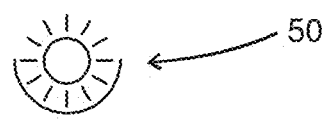
Fig. 10.2
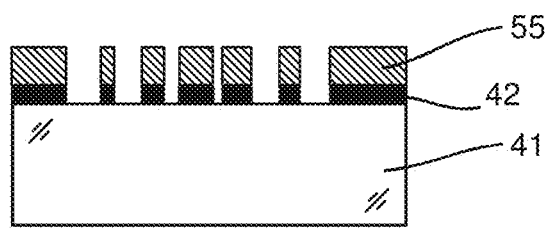
Fig. 10.3
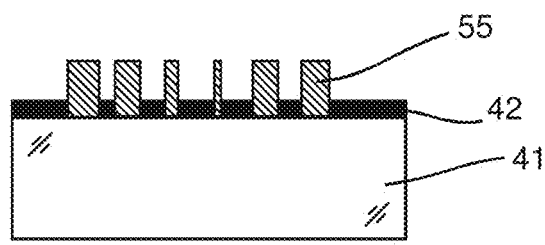
Fig. 10.4

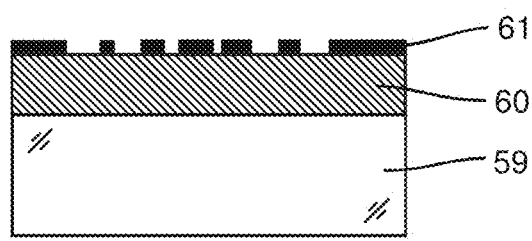
Fig. 11.1
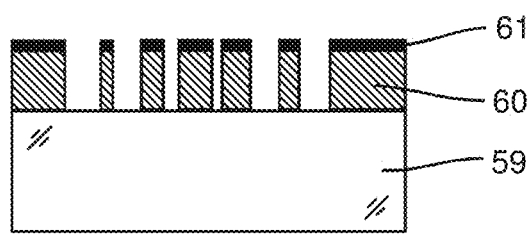
Fig. 11.2

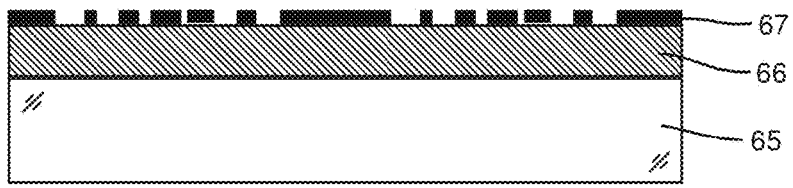
Fig. 12.1
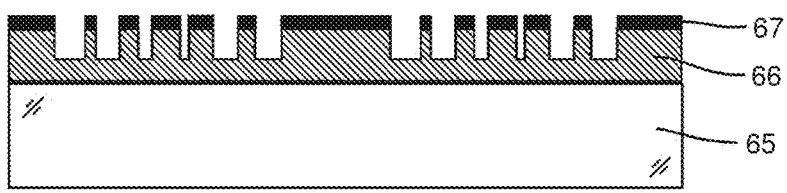
Fig. 12.2
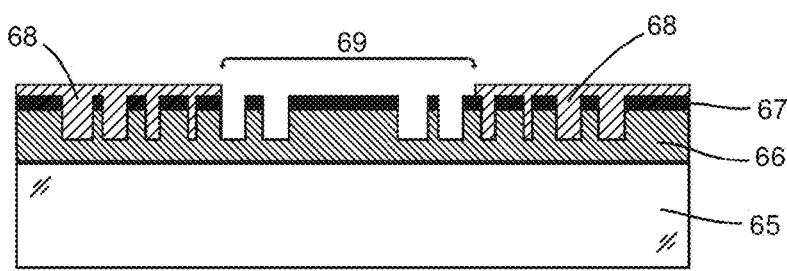
Fig. 12.3
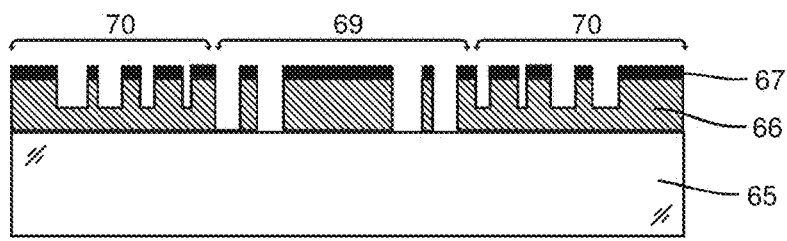
Fig. 12.4

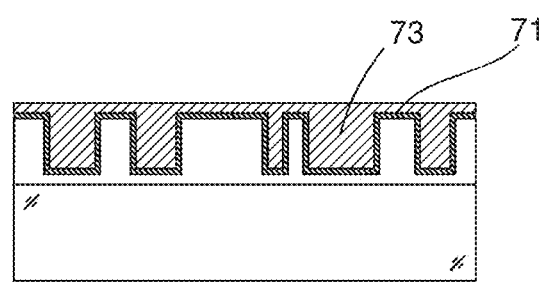
Fig. 13.1
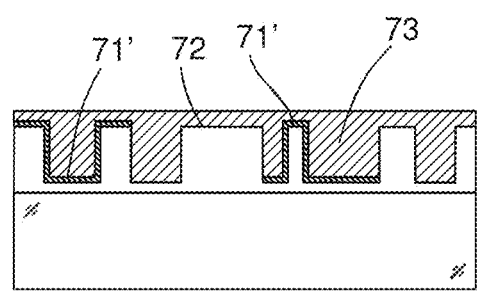
Fig. 13.2

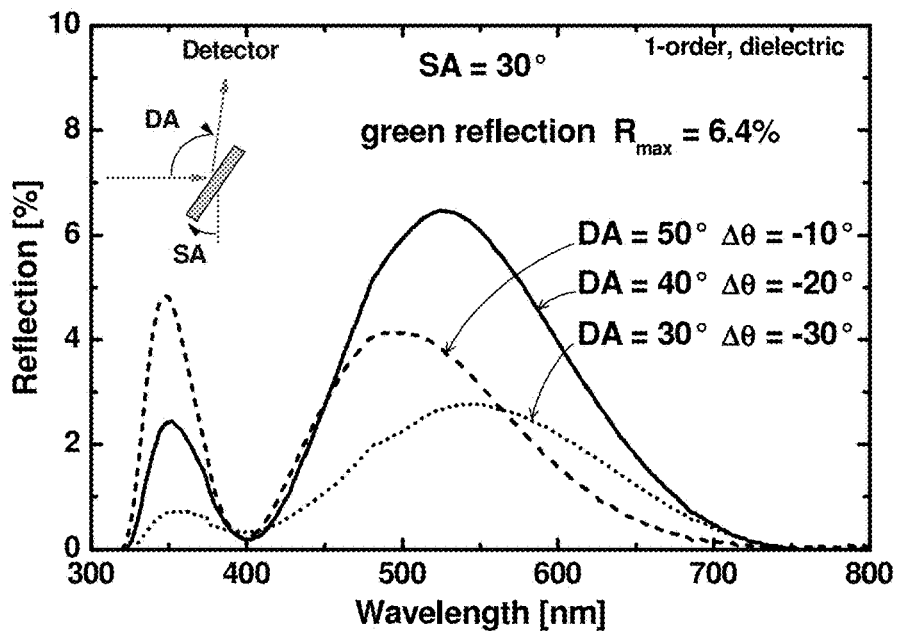
Fig. 14.1
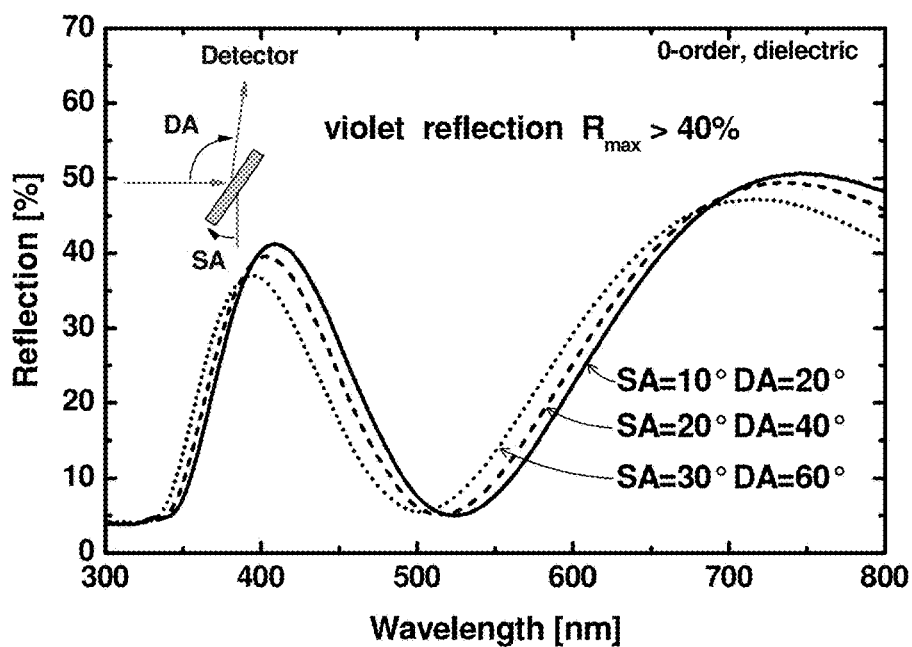
Fig. 14.2

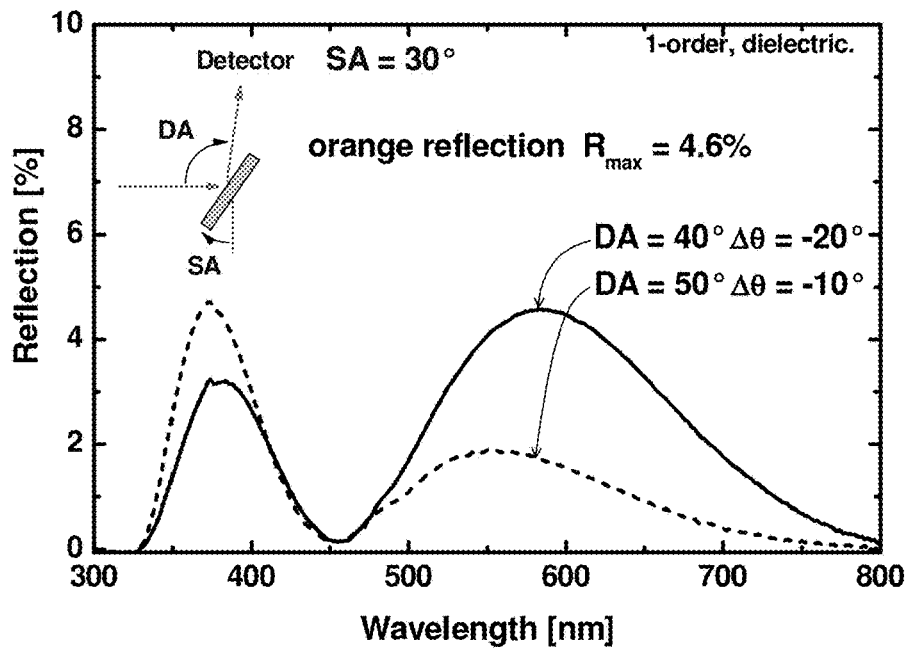
Fig. 15.1
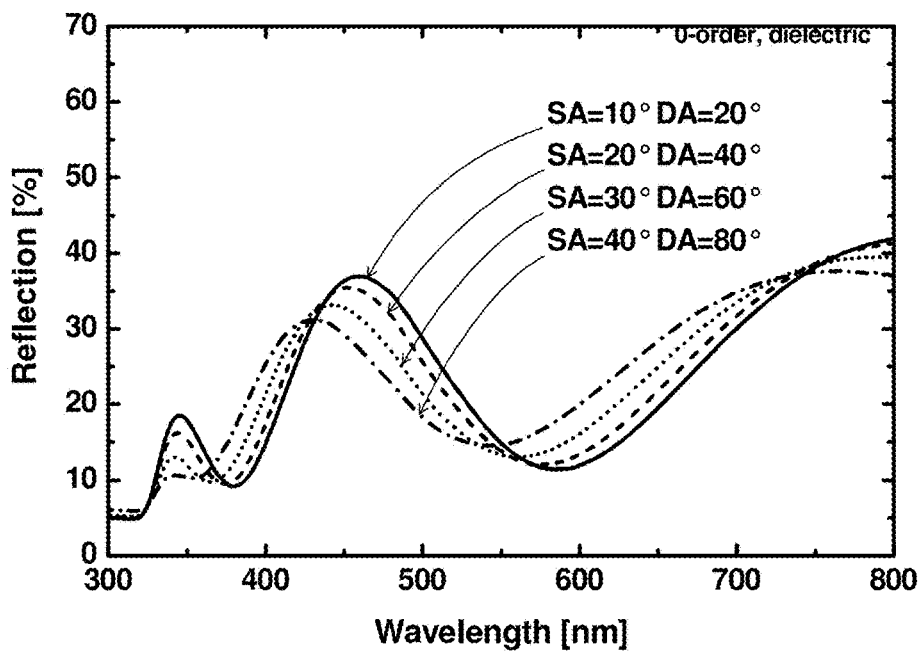
Fig. 15.2

OPTICALLY EFFECTIVE SURFACE RELIEF MICROSTRUCTURES AND METHOD OF MAKING THEM

CROSS-REFERENCE TO RELATED APPLICATIONS

This is a Divisional Application of U.S. application Ser. No. 12/297,126, filed Oct. 14, 2008, which is a National Stage of International Application No. PCT/CH2007/000227, which claims priority from European Patent Application No. 06113901.0 filed May 12, 2006. The entire disclosures of the prior applications are incorporated herein by reference in their entirety.

TECHNICAL FIELD

The invention relates to optical devices with a characteristic color appearance, which may, for example, be used for securing documents and articles against counterfeiting and falsification.

More particularly, the invention relates to elements having at least one surface area with an optically effective surface relief microstructure and methods for making such elements.

BACKGROUND OF THE INVENTION

The use of optical devices for the protection against counterfeiting, illegal tampering and product protection in general is now a well established art.

Due to increased fraud and counterfeit, novel anti-counterfeit measures are constantly required. For many years holograms have been the preferred security technology. Meanwhile, this technology is more than 30 years old and therefore well known and widespread. Holographic foils may even be found in every gift shop today. This situation represents a security risk since many people have access to the hologram technology. With the availability of digital hologram printers, the path to easy to use holographic mastering systems has further opened. These printers allow the production of many different types of holograms and a minimal knowledge of holographic set-ups or laser writers is required. Such equipment allows the preparation of masters for the subsequent metal master fabrication and the replication into thin-films in large volumes.

It is thus most desirable to extend the palette of security devices by novel security features, which are clearly distinguishable from holographic devices. Examples of such new devices are alternative optically variable devices (OVD). OVDs are devices that change their appearance as the viewing angle or illumination angle is changed. A subgroup of OVDs are colorshift devices. Colorshift OVDs change their color as the viewing or illumination angle is changed. Prominent representative colorshift OVDs are cholesteric or interference films, including optical devices based on flakes of such films. Both exhibit a pronounced colorshift as the device is tilted away from a perpendicular angle of view. No rainbow colors, a characteristic feature of standard mass-produced holographic devices, are observed in these types of colorshift devices.

Colorshift effects due to the interference of light at thin optical films have a long tradition in the history of modern thin film components (e.g. J. A. Dobrowolski, "Optical thin-film security devices", in "Optical Document Security" ed. by R. L. van Renesse, Artechouse Boston 1998). Many different compositions of layered thin-film systems are possible. A characteristic reflection spectrum is obtained for instance at normal light incidence. The reflection or transmission spectra are shifted toward the short wavelength side as the incidence angle increases. Multi-layer thin-film systems, often combinations of dielectric and metallic layers, are also possible with dielectric materials only. In this case, thin-films of different index of refraction are required.

Security devices based on either thin interference films or on flakes of such films are commercially available today. Examples can for instance be found in U.S. Pat. Nos. 5,084,351 and 6,686,042 of Flex Products, Inc.

Other approaches are scattering devices. The use of isotropic and even more anisotropic scattering effects in OVDs can enhance the optical attractiveness significantly. Especially anisotropic light scattering is a helpful means to generate viewing angle sensitive devices. FIGS. 1.1 and 1.2 illustrate isotropic and anisotropic light scattering respectively.

The reflection at an isotropically structured surface, such as a newsprint or most surfaces encountered in household articles, is such that no azimuthal direction is preferred. As indicated in FIG. 1.1, collimated incoming light 1 is redirected at the scattering surface 2 into new outgoing directions 3 with a characteristic axial-symmetric output light distribution and a characteristic divergence angle 4.

An anisotropically structured surface however reflects light in a pronounced way into certain directions and suppresses light in other directions. In FIG. 1.2, collimated incoming light 1 impinges on an anisotropically scattering surface 5 and is redirected into new outgoing directions 6 with a characteristic output light distribution 7, which depends on the corresponding azimuthal angle 8, 8'.

For the representation of information, a pattern of individual pixels with anisotropic scattering behavior and differing anisotropy direction orientation can be made. In this way, corresponding devices may comprise a patterned anisotropically scattering surface, which represents an image such as a text or a picture or the like. Since the light in a given direction is reflected or suppressed depending on the specific pixel orientation, an image of bright and dark pixels is seen. In addition, these devices exhibit a pronounced change from positive to negative view when they are tilted or rotated. Such patterned surface devices can for example be generated as follows. First, the gray scale image of interest is rastered, that means, the image is split into dark and bright zones with a certain pixel resolution. Then, the dark zones (pixels) are attributed to anisotropically scattering zones of a first orientation direction and the bright zones are attributed to anisotropically scattering zones with a different orientation direction, e.g. perpendicular to the first orientation direction. An illustration of a square of 2×2 pixels with such an orientation arrangement is given in FIG. 2. Pixels 10 and 10' are oriented in one direction and pixels 11 and 11' are oriented crosswise. A device with a pattern of pixels arranged like this will appear as positive under a first viewing angle and will flip to the negative as the device is e.g. rotated by 90°.

A known method of manufacturing anisotropic scattering films with patterned anisotropy is described in the international patent application WO-01/29148 of Rolic AG and also, for example, in Ibn-Elhaj et al., "Optical polymer thin films with isotropic and anisotropic nano-corrugated surface topologies", Nature, 2001, vol. 410, p. 796-799. For the making of the surface structures, use is made of a so called monomer corrugation (MC) technology. It relies on the fact that phase separation of special mixtures or blends applied to a substrate is induced by crosslinking, for instance with exposure to ultraviolet radiation. The subsequent removal of non-crosslinked components leaves a structure with a specific surface topology. The topology may be made anisotropic by the alignment of an underlying alignment layer, and by using a patterned alignment layer, it is possible to create a patterned anisotropically scattering surface topology.

As mentioned above, an interesting and desired feature for many purposes, in particular for the application as security device, are special colors and colorshift effects. In the international patent application WO-2006/007742, it is shown with a single example (Example 5) that based on MC technology it is in principle possible to reach modulation depths, which are deep enough to generate a pastel-colored appearance. However, although the average modulation depth and the average periodicity of MC surface topologies can be tuned by several means, the two parameters can not be made independent from each other. Therefore, and due to the characteristic surface modulation shape induced by the MC technology, the color saturation of MC generated scattering surfaces is limited. More saturated colors, which are essential for many applications, are not possible with corresponding devices.

In the context of optical devices reference is made to US 2003/0072412 A1. In this document an optically active surface structure is disclosed comprising a substrate with a multilayer structure comprising grooves which are positioned between lands. It is noted that the structure disclosed in US 2003/0072412 A1 in principle is a periodic structure, because it is specifically noted that inside each effective period, designated d, the lands are distributed randomly, however within each of these periods the same random pattern is used. So there is a random distribution within one period which is however identically repeated in each period. The structure is thus periodical. Analogous structures are disclosed in DE 10 2004 003 984 A1 as well as in US 2005/0094277 A1.

Equally periodic surface structures are disclosed in US 2005/0219353 A1 in the context of anti-reflective coatings. In spite of the fact that in the text random placement of protruding optical pieces is mentioned, there is no display of a non-periodic arrangement of these optical pieces. On the other hand the actual methods disclosed for making anti reflective coating structures will clearly not lead to structures with protruding optical pieces as given in the displays, i.e. with a constant modulation depth.

US 2003/0011870 A1 discloses a substrate with a light reflection film in which the heights of a plurality of convex portions or the depths of concave portions formed on a base material are specified to be substantially the same. The two-dimensional shapes of the plurality of convex portions or concave portions are specified to be the two-dimensional shapes of independent circles and polygons, or of either of them. In addition, the plurality of convex portions or concave portions are arranged in the direction of the plane on a random basis. The substrate is formed using a mask in which light transmission portions or light non-transmission portions are formed in units of dots, the number thereof being smaller than the number of dot regions. The dots are arranged irregularly in each of the units, and a plurality of units are included.

JP2005-215642 provides a photomask for manufacturing a diffusion reflector having high scattering luminance and a method for manufacturing the diffusion reflector by using the photomask. The photomask has a pattern region where a unit pattern region is laid in a matrix. The pattern region has a rectangular light transmitting part in a plurality of numbers laid in a matrix, a circular minute light transmitting part in a large number regularly or randomly laid to surround each light transmitting part, and a light shielding part surrounding the. Further, a strip portion surrounding the light transmitting part has no minute light transmitting part, and the width of the strip portion is 1 μm to 5 μm.

SUMMARY OF THE INVENTION

An object of the present invention is therefore to provide surface structures, which by itself, i.e. without the need of additional elements or layers, at the same time show (a) scattering effects, which are suitable to display images and also a positive-negative image flip without rainbow colors, and (b) a distinct and saturated color appearance.

A further object of the present invention is to provide methods of making such surface structures.

Thus, according to one aspect of the invention, there is provided an element having at least one surface area with an optically effective surface relief microstructure, which surface relief microstructure has a surface modulation of transitions from bottom regions to top regions and from top regions to bottom regions, wherein in a (first) lateral direction of the surface area there is (in average) at least one transition from a top region to a bottom region or vice versa within every 20 micrometer, and preferably additionally in a second lateral direction of the surface area, which is perpendicular to the first direction, there is in average at least one transition from a top region to a bottom region or vice versa within every 200 micrometer, characterized in that
(i) in the (first) direction the lateral arrangement of the transitions is non-periodic, and
(ii) the top regions substantially lie in the same top relief plateau and the bottom regions substantially lie in the same bottom relief plateau, such that the relief modulation depth is substantially equal over the surface area.

Some definitions shall be given for a more complete understanding of the above and subsequent discussion of the invention:

As is well known to the person skilled in the art, a periodic function is a function that repeats its values after some definite period has been added to its independent variable. In contrast to that a non-periodic function is a function for which no definite period can be defined after which it repeats its values. Periodicity can be determined by a number of methods, one of them being the determination of correlation functions in one or several dimensions.

As is also well known to the person skilled in the art, a plateau of a function is a part of its domain where the function has a constant value. In the context of the present invention therefore the top relief plateau and the bottom relief plateau are regions where the function defining the surface has an essentially constant value in a direction orthogonal to the plane of the substrate (along the z-direction). It is noted that to actually have such regions and not essentially continuous, or quasi-continuous, e.g. sinusoidal transitions between the top and bottom within the surface structure is a differentiating feature.

The difference in height between the levels of these two plateaus is equal or substantially equal over the surface area, meaning that the variations in this height of the two plateaus over the surface area in z-direction is typically less than 20%, preferably less than 10%, even more preferably less than 5%. The presence of these plateaus and the fact that the difference in height between the levels of these two plateaus is equal or substantially equal over the surface area can also be quantified using the merit function as given below in more detail.

The anisotropic axis is the direction along which the surface has the least modulations, so usually it is the direction of the groove or groove like structures in the surface topology.

The surface relief fill factor is defined as the ratio of the total area of top regions to the integrated area over all top and all bottom regions.

It is believed that feature (i) is one of the main reasons for the absence of otherwise occurring rainbow colors, whereas feature (ii) mainly provides a saturated color appearance.

To further characterize the element of the present invention, an averaged one-dimensional autocorrelation function $AC(x)$ of the surface relief microstructure in at least one direction, which for anisotropic surface modulations is the direction perpendicular to an anisotropic axis, is introduced. The autocorrelation function defines a correlation length, the autocorrelation length, which is the length within which the envelope of the autocorrelation function decays to 10% of the AC at $x=0$. In the context of the present invention the term non-periodic is normally used for the condition that the autocorrelation length is smaller than three times an average lateral distance between adjacent transitions of top and bottom regions.

According to a preferred embodiment, the lateral arrangement of the transition is non-periodic also in a second direction, which is perpendicular to the first direction.

According to another preferred embodiment, the element has a pattern of a plurality of surface areas with optically effective surface relief microstructures. The pattern may represent an image such as a text or a picture or the like or may be part of an image such as a text or a picture or the like. The image may also comprise areas without optically effective surface relief microstructures. Such areas will consequently not exhibit the saturated colour appearance, which is typical for areas exhibiting surface relief microstructures.

In a further aspect, the invention relates to security devices comprising such elements.

In another aspect of the invention, there is provided a method for making an element having at least one surface area with an optically effective surface relief microstructure. In the method, first a mask is created, which has a microstructure of first and second zones of different transparency, wherein in a (first) lateral direction of the mask there is (in average) at least one transition from a first to a second zone or vice versa within every 20 micrometer, and preferably additionally in a second lateral direction of the mask, which is perpendicular to the first direction, there is in average at least one transition from a first to a second zone or vice versa within every 200 micrometer, and wherein in the (first) direction the lateral arrangement of the transitions is non-periodic. Then, with the help of the mask a relief microstructure in the surface of a resin or resist is generated to produce top regions corresponding to the first zones of the mask and bottom regions corresponding to the second zones of the mask. Thereby, the top regions substantially lie in a top relief plateau and the bottom regions substantially lie in a bottom relief plateau, such that the relief modulation depth is substantially equal over the whole surface area.

So the principle of the method can be summarized in that a microstructure of first and second zones of different transparency is used, wherein in a (first) lateral direction of the mask there is (in average) at least one transition from a first to a second zone or vice versa within every 20 micrometer, and preferably also in a second lateral direction of the mask, which is perpendicular to the first direction, there is in average at least one transition from a first to a second zone or vice versa within every 200 micrometer, and wherein in the first direction the lateral arrangement of the transitions is non-periodic, as is for example available and readily accessible by means of the above-mentioned MC technology. The drawbacks or limitations of this MC technology are avoided by in principle only using the two-dimensional, anisotropic topology pattern present in such a microstructure and by using that two-dimensional anisotropic topology pattern as a "template" for generating a much more clearly and distinctly structured profile in the third dimension, i.e. in a direction perpendicular to the plane of the microstructure. This clear and distinct profile means that the top regions of a finally generated structure substantially lie in a top relief plateau and the bottom regions substantially lie in a bottom relief plateau.

In an extreme case this means that the two-dimensional anisotropic topology pattern, so basically a cut through such a microstructure as for example available via MC technology, is projected along the third dimension such that there is a top plateau with exactly this two-dimensional topology, and a bottom plateau with a negative of this two-dimensional topology, and between there are vertical transitions. The less extreme cases still within the present invention can e.g. be characterised by a specific bimodal distribution along the third dimension as characterised by the merit function M discussed below.

According to a preferred embodiment of the method, the microstructure of first and second zones of different transparency of the mask is created with the following steps. First, a film with a topologically structured corrugated surface structure is deposited on a layer of a mask material. Then, the thickness of the film is reduced until the material of the film in lower zones of the corrugated surface is cleared away and parts of the underlying mask material are set free. After that, the parts of the mask, which are set free, are removed.

The invention also relates to preferred uses of elements as outlined above. Preferably, such elements are used as security elements in a security device. The security devices can be applied to or incorporated into a security document. Security documents are for example banknotes, passports, licenses, stocks and bonds, coupons, cheques, credit cards, certificates, tickets etc. The security devices further can also be applied as or incorporated into brand or product protection devices, or into means for packaging, like wrapping paper, packaging boxes, envelopes etc. Advantageously, the security device may take the form of a tag, security strip, label, fiber, thread, laminate or patch etc.

An important aspect of the present invention is that the optically effective surface relief microstructures can be replicated with adequate replication techniques since the relevant optical effect stems from the surface relief modulation interface. It is therefore possible to apply standard replication techniques to mass fabricate such devices at adequate costs once a master has been made available. Today, two popular and cost effective replication techniques are UV embossing and hot embossing (see for instance M. T. Gale: "Replication techniques for diffractive optical elements" in Micro-electronic Engineering, Vol. 34, page 321 (1997)).

According to a preferred embodiment the optically effective surface relief microstructure is made of a single material, however, in order to get an intense color reflection, surface relief microstructures according to the invention will typically be coated with a reflecting material such as aluminium, gold, chromium, copper or similar.

Particularly for security applications, the surface relief microstructures have to be sealed in order to protect the device against mechanical impact, contamination and in order to prevent unauthorized and illegal making of replicas of such devices. Adequate protection and passivation films are transparent dielectric materials or materials with a specific absorption behavior that may further enhance the color appearance of the device.

Elements according to the invention may also hold high resolution images, graphical components, microtext and similar features. The color appearance normally is viewing angle sensitive and might transform into a colorless image at large viewing angle. The scattering properties of the image pixels can be tuned such that a marked scattering takes place into predefined directions. If pixels with such behavior are generated and accordingly arranged, a pronounced positive negative image flip takes place upon tilting or rotating the device.

Furthermore, a broad color palette may be obtained, for example, from lower to deeper modulation the colors yellow, orange, rose, violet, blue and green. For even deeper structures, higher order colors can appear.

BRIEF DESCRIPTION OF THE DRAWINGS

The invention is further illustrated by the accompanying drawing figures. It is emphasized that the various features are not necessarily drawn to scale.

FIG. 1.1 is an illustration of light reflection at an isotropically structured surface.

FIG. 1.2 is similar to FIG. 1.1, but illustrates the characteristic output light distribution from a reflection at an anisotropically scattering surface.

FIG. 4.1, FIG. 4.2 and FIG. 4.3 give schematically illustrative examples of possible anisotropic surface relief patterns.

FIG. 5.1 shows an AFM image of a prior art surface hologram microstructure.

FIG. 5.2 shows the two-dimensional autocorrelation function of the AFM image of FIG. 5.1.

FIG. 5.3 gives the averaged horizontal one-dimensional autocorrelation function of the AFM image of FIG. 5.1 perpendicular to the anisotropy axis.

FIG. 6.1 shows an AFM image of an anisotropic surface relief microstructure according to the invention.

FIG. 6.2 shows the two-dimensional autocorrelation function of the AFM image of FIG. 6.1.

FIG. 6.3 gives the averaged horizontal one-dimensional autocorrelation function of the AFM image of FIG. 6.1 perpendicular to the anisotropy axis.

FIG. 7.1 is an AFM image of the microstructure shown in FIG. 3.

FIG. 7.2 gives a height histogram of the microstructure shown in FIG. 3 and FIG. 7.1.

FIGS. 8.1 to 8.5 illustrate the generation of a mask that it is suitable for the method according to the invention for making elements having surface relief microstructures.

FIGS. 9.1 to 9.3 illustrate the use of a mask according to FIG. 8.5 for contact photolithography to make an element having a surface area with an optically effective surface relief microstructure according to the invention.

FIGS. 10.1 to 10.4 illustrate a different approach of photolithography to make an element according to the invention.

FIGS. 11.1 and 11.2 illustrate still another approach to make an element according to the invention, using direct etching through a metal mask.

FIGS. 12.1 to 12.4 outline a method for making an element with two areas with different surface relief microstructures.

FIGS. 13.1 and 13.2 illustrate examples of surface relief microstructures according to the invention, which are made reflective or partially reflective.

FIGS. 14.1 and 14.2 show non-specular and specular reflection spectra of a green reflecting microstructured element according to the invention.

FIGS. 15.1 and 15.2 show non-specular and specular reflection spectra of an other, orange reflecting microstructured element according to the invention.

DETAILED DESCRIPTION OF THE INVENTION

Figure 2:
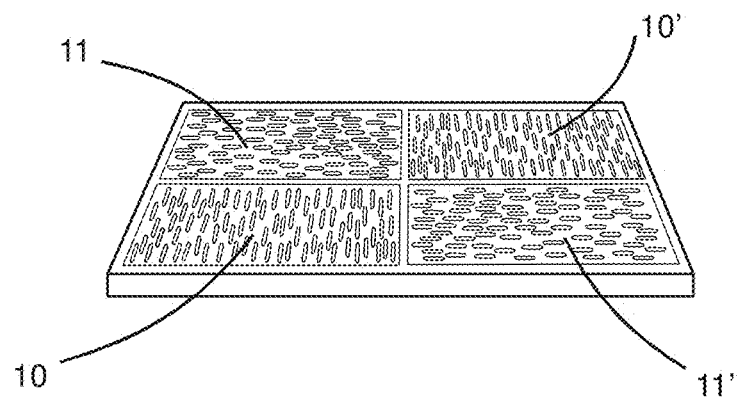
FIG. 2 illustrates pixels with differing anisotropy direction orientation.
Figure 3:
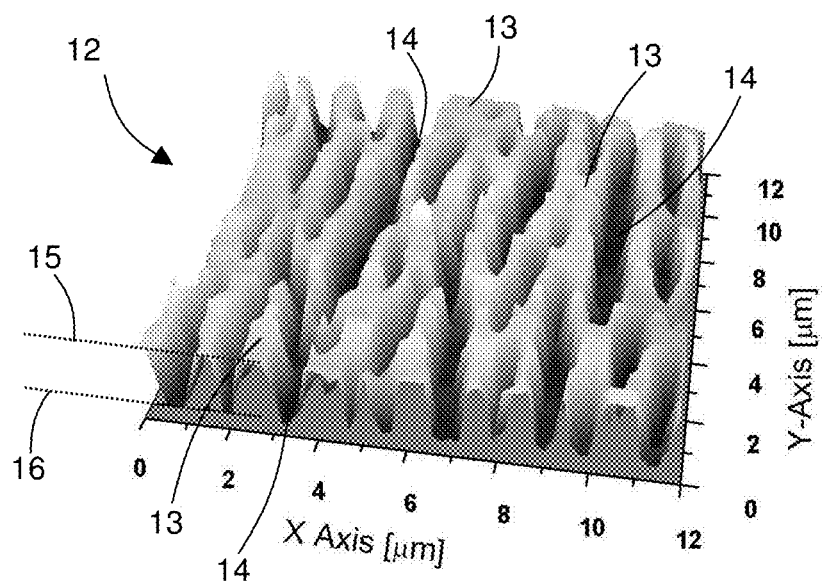
FIG. 3 shows a three-dimensional view (AFM image) of a surface relief microstructure according to the invention.

An example of a surface relief microstructure 12 according to the invention is shown in FIG. 3 as a three-dimensional view of an atomic force microscopy (AFM) image of 12 micrometers×12 micrometers. The microstructure was made according to a method described later on below.

A surface modulation builds transitions from top regions 13 to bottom regions 14. The width of top and bottom regions 13 and 14, so of the plateaus, typically lie in a range from 200 nanometers to about 20 micrometers. It is possible and for many applications a prerequisite—that the surface modulation is anisotropic. This is for example also the case for the microstructure shown in FIG. 3. The microstructure has groove-like bottom regions, which extend substantially along the Y-axis such that the surface modulation has an anisotropy axis parallel to the Y-axis. For anisotropic modulations, the lateral dimensions of the top and bottom regions of surface relief microstructures according to the invention can be described by the fact that there is in average at least one transition from a bottom region to a top region or vice versa within every 20 micrometers in a first lateral direction and in a second lateral direction of the surface area, which is perpendicular to the first direction, there is in average at least one transition from a top region to a bottom region or vice versa within every 200 micrometer.

In FIG. 3 the first direction corresponds to the direction at right angles to the grooves and the second direction corresponds to the direction along the grooves. In said second direction, the other lateral directions, for instance parallel to the grooves, the transitions may thus be much more widely spaced or there may be even no transition for grooves that extend over the whole microstructure.

The surface relief microstructure may form a reflecting surface. The reflective surface can for instance be made of a thin metal film such as aluminium, chromium or the like covering the microstructure. Alternatively, the reflection can be caused by a transition to a material having a different index of refraction. The surface of the microstructure may face the air, or, for example, may be covered with a dielectric material. The cover medium could also be absorptive for certain colors to enhance the color appearance of the device.

In preferred embodiments of surface relief microstructures according to the invention, in a first lateral direction of the surface area, the average lateral distance between adjacent transitions from a top region to a bottom region or vice versa lies in the range from 0.5 micrometer to 10 micrometers. Advantageously, the average lateral distance lies in the range from 0.5 micrometer to 5 micrometers. Advantageously in the second lateral direction, which is perpendicular to the first lateral direction, the average distance between transitions from a top region to a bottom region is less than 100 micrometers, more advantageously less than 50 micrometers.

The optical modulation depth preferably lies in the range from 100 nanometers to 1,000 nanometers, more preferably from 100 nanometers to 500 nanometers. In the context of the present invention the optical modulation depth is the product of the mechanical relief modulation depth and the index of refraction of the material filling the surface modulation.

Surface relief microstructures according to the invention are characterized by very specific surface modulations.

Firstly, the lateral arrangement of the transitions from top to bottom regions and from bottom to top regions is non-periodic. This is especially in contrast to for example optical gratings and holographic surface structures.

Secondly, the top regions substantially lie in the same top relief plateau and the bottom regions substantially lie in the same bottom relief plateau, such that the relief modulation depth is substantially equal over the whole surface area. In FIG. 3, the top and bottom relief plateaus are indicated at the front section with dotted lines 15 and 16. In the example shown, the relief modulation depth (or plateau to plateau distance) is about 290 nanometers. This second characteristic, a so to speak "binary" modulation, is especially in contrast to previously known microstructures based on MC technology as described in the introductory part above.

It is well known to a skilled person that there exist a large variety of natural and man made surfaces with different isotropic and anisotropic scattering properties. Familiar examples of isotropic scattering surfaces are ground glasses used for instance in illumination systems. Such scattering glasses transmit or reflect light without favoring a certain azimuthal scattering direction.

Optical devices, which are based on anisotropic surface relief structures, favor light scattering or diffraction into preferred azimuthal directions. One-dimensional diffusers belong to this class of optical devices. Their surface relief z(x,y), does only depend on one transverse coordinate, e.g. x. The surface relief anisotropy axis is thus parallel to the other transverse coordinate, e.g. y. Light propagating in the z-x plane will be scattered in the z-x plane. Other examples of anisotropic optical scattering devices are described in the above-mentioned WO-01/29148 and WO-2006/007742. These anisotropic scattering devices have surface grooves or patterns which are anisotropic and scatter light primarily perpendicular to the long thin groove or pattern axis.

Most isotropic and anisotropic diffusers are intended to be used in lightening systems and thus hold a high degree of achromaticity. This is in contrast to optical devices according to the present invention, which hold a color appearance and are based on scattering and interference at two scattering surface relief plateaus.

An anisotropy of the surface relief allows to enhance the brilliance of the device and allows the generation of vivid graphical designs such as positive negative flips or moving graphical elements depending on the viewing or the illumination angle.

Examples of possible anisotropic surface relief patterns, which are schematically illustrative of relief microstructures according to the invention, are shown in FIG. 4.1, FIG. 4.2 and FIG. 4.3. In each figure, two anisotropic surface relief pixels 20/20', 21/21' and 22/22' respectively are shown with their anisotropy axis rotated by 90° against each other. The anisotropy axis is vertical in the left pixel and horizontal in the right pixel. The anisotropic patterns according to FIG. 4.1 are elongated rectangular grooves 23. The anisotropic patterns according to FIG. 4.2 are elongated round shaped rectangular elevations 24. The anisotropic patterns according to FIG. 4.3 are elongated line grooves. The visually perceived light is basically scattered or diffracted at the thin grooves or elevations. Other anisotropic surface relief patterns according to the invention can be gathered from the examples given hereinafter.

To further describe structures of this type the term surface relief aspect ratio (SRAR) is defined for the context of this invention as the average length to width ratio of the anisotropic surface relief patterns. The SRAR strongly determines the azimuthal optical appearance of light scattered at the surface relief microstructure. For SRAR=1, which corresponds to surface relief patterns which exhibit in average the same extension in at least two lateral directions, the scattering properties for incident light is almost independent on the azimuthal incident angle of the light. Therefore, the intensity of light reflected from the surface of relief microstructures with SRAR=1 does almost not change when the element containing the surface relief microstructure is rotated along an axis perpendicular to the surface of the element.

For anisotropic relief structures, which means SRAR>1, the intensity of the reflected light depends on the azimuthal incidence angle of the light. In order to be able to visually recognize this dependency on the azimuthal incident angle, SRAR should be larger than 1.1. To increase the visible contrast of images set-up of patterns of surface relief structures with different anisotropic axis, SRAR values larger than 2 are preferable. Even more preferable are SRAR values larger than 5.

For very large SRAR values the range of azimuthal angles into which a significant amount of light is scattered becomes smaller, which makes it more difficult to recognize the reflected light from an image made of surface relief patterns. Therefore, it is an objection of this invention to provide a parameter which can be tuned to design surface relief structures such that the optical appearance of light reflected from their surface is optimized in terms of contrast and azimuth angle range of visibility. In a preferred embodiment, the SRAR is therefore less than 50, more preferably SRAR is less than 20.

It has furthermore been found that preferred embodiments of surface relief microstructures according to the invention can be geometrically characterized by suitably chosen transversal and depth properties of the surface relief. These properties will be described in the following. They may be determined from any actual surface, preferably on the basis of AFM images.

One property is the fact that the surface relief is strongly uncorrelated and thus is characterized by a short autocorrelation length.

A helpful parameter to characterize non-periodic or non-deterministic surface profiles is the autocorrelation function and a related autocorrelation length. The one-dimensional or two-dimensional autocorrelation function of a surface profile can be understood as a measure for the predictability of the surface profile for two spatially separated points by a distance x in the plane.

The autocorrelation function AC(x) of a function P(x), such as the surface relief microstructure profile, is defined as $$AC(x) = \int P(x') \cdot P(x'+x) \cdot dx'$$

More details on the autocorrelation function and corresponding programming issues can be found e.g. in "Numerical recipes in C: the art of scientific computing/William H.

Press; Saul A. Teukolsky; William T. Vetterling; Brian P. Flannery.—Cambridge; N.Y.: Cambridge University Press, 1992". The application of the autocorrelation function for pattern recognition in image processing is discussed e.g. in "Digital image processing/William K. Pratt.—New York: Wiley, 2001".

For a non-periodic or non-deterministic surface profile, the autocorrelation function decays rapidly with increasing x. On the other hand, for a deterministic surface profile found for instance in a grating, the autocorrelation does not decay. In the case of the grating the autocorrelation function is however modulated with a periodic function. For a nearly periodic grating the envelope decays with increasing x as well.

With the help of the one-dimensional autocorrelation function, a single characteristic number, an autocorrelation length L, can be defined. It is the length for which the envelope of the autocorrelation function decays to a certain threshold value. For the present purpose, a threshold value of 10% of AC(x=0) proved to be suitable.

In order to specify the autocorrelation length L, a further parameter, an average groove to groove distance P is defined. The autocorrelation length of microstructures according to the present invention must be smaller than a certain value in units of P.

Thus, preferred embodiments of surface relief microstructures according to the invention are characterized in that the surface relief in at least one direction, which for anisotropic surface modulations is the direction perpendicular to an anisotropic axis, has an averaged one-dimensional autocorrelation function AC(x) that has an envelope, which decays to 10% of the AC at x=0 within an autocorrelation length, wherein the autocorrelation length is smaller than three times an average lateral distance between adjacent transitions of top and bottom regions.

More preferred are surface relief microstructures, wherein the autocorrelation length is smaller than two times an average lateral distance between adjacent transitions of top and bottom regions. Even more preferred are surface relief microstructures, wherein the autocorrelation length is smaller than one average lateral distance between adjacent transitions of top and bottom regions.

In another preferred embodiment the autocorrelation length (L) is greater than one hundredth average lateral distance between adjacent transitions of top and bottom regions.

For surface relief microstructures according to the invention, which have anisotropically scattering surface modulations, the anisotropy axis can be found for instance on the basis of an adequate AFM image or a derived autocorrelation function. The one-dimensional autocorrelation function has then to be evaluated along lines perpendicular to the anisotropy axis and finally averaged, such that an averaged one-dimensional autocorrelation function results. From this averaged one-dimensional autocorrelation function, the envelope and the autocorrelation length L is determined.

The above described geometric characterization of surface relief microstructures is further illustrated by the following two examples. The first example is a surface relief microstructure of a surface hologram well known in the prior art; corresponding AFM image and autocorrelation functions are given in FIGS. 5.1, 5.2 and 5.3. The second example is a surface relief microstructure according to the invention, for which corresponding AFM image and auto-correlation functions are given in FIGS. 6.1, 6.2 and 6.3.

FIG. 5.1 shows a 15 μm×15 μm AFM image of the surface relief microstructure of a surface hologram. In FIG. 5.2, the two-dimensional autocorrelation function of the AFM image of FIG. 5.1 is given. Obviously, the disturbed visible grating seen in the AFM image is correlated over the whole image area and in all directions. An anisotropy axis can be determined from the AFM image or the two-dimensional autocorrelation function.

The averaged horizontal one-dimensional autocorrelation function, which is evaluated along lines perpendicular to the anisotropy axis, is shown in FIG. 5.3. The autocorrelation function 30 has an envelope, which is indicated by a hatched curve 31. It is seen that within the seven lateral groove to groove distances (peaks of the autocorrelation function) shown in the figure, the envelope does not decay below 10% of the autocorrelation function at the position 0. Thus, the autocorrelation length, defined by the decay of the envelope to 10%, is for the surface hologram shown in FIG. 5.1 considerably larger than seven lateral groove to groove distances.

Now, a 15 μm×15 μm AFM image of a surface relief microstructure according to the invention is shown in FIG. 6.1 and the corresponding two-dimensional autocorrelation function is given in FIG. 6.2. It is interesting to note from the fast decay of the autocorrelation function in the center of FIG. 6.2 that the microstructure according to the invention is barely correlated.

From the AFM image of FIG. 6.1 it is seen that the bottom regions of the microstructure according to the invention have the form of grooves, which extend in the vertical direction. So the anisotropy axis is vertical.

In FIG. 6.3, curve 34 represents the averaged horizontal one-dimensional autocorrelation function of the surface relief microstructure of FIG. 6.1, evaluated along lines perpendicular to the anisotropy axis. In contrast to the prior art microstructure of the previous example, the one-dimensional autocorrelation function in this case steeply descends and its envelope practically coincides with the function itself. Thus, the envelope quickly decays below 10% and the corresponding autocorrelation length L is less than one lateral groove to groove distance.

Another property of surface relief microstructures according to the invention is the two pronounced surface relief plateaus. The quality of these may be quantified for preferred embodiments by a function based on the height (or depth) histogram of the surface relief.

Ideally, an element according to the present invention would be a pure two height level system made of flat top and bottom regions separated by a characteristic plateau to plateau distance. Light scattered at such an optical element will generate two types of scattered light beams: one scattered at the top regions and the other scattered at the bottom regions. The two light beams will interfere and thus generate the resulting color effects.

In reality, however, manufacturing processes result in wanted or unwanted irregularities and thus smear the top and bottom regions and the plateau to plateau distance. Therefore, a height histogram over the surface relief microstructure may be a good statistical instrument to characterize the surface relief and make the wanted plateaus visible. The histogram can for instance be derived from appropriate AFM images. The involved mathematical operation is included in most math software or in any modern image processing software.

Since surface relief microstructures according to the invention retain two pronounced surface relief plateaus, two pronounced peaks should be found in the histogram. This is further illustrated in FIGS. 7.1 and 7.2.

FIG. 7.1 is an AFM image of the microstructure according to the invention already shown in FIG. 3, and FIG. 7.2 gives the corresponding histogram. The two pronounced peaks are clearly visible.

To quantify another property of surface relief microstructures, the surface relief fill factor is introduced. In the context of the present invention the surface relief fill factor is defined as the ratio of the total area of top regions to the integrated area over all top and all bottom regions. For good and best optical performance, it normally may be advantageous when the top and bottom regions approximately have the same total area. In other words, the top and bottom regions should balance each other, which means, the surface relief fill factor should be near 0.5. This corresponds to a histogram with two peaks of the same size. For the microstructure shown in FIG. 7.1, there is a slight asymmetry in the histogram given in FIG. 7.2; the total area of the bottom regions is slightly smaller than the total area of the top regions.

In general, the surface relief fill factor of surface relief microstructures according to the invention may lie in a quite broad range. Preferably, the surface relief fill factor is between 0.05 and 0.95 preferably between 0.2 and 0.8. More preferably, the surface relief fill factor lies between 0.3 and 0.7 or between 0.4 and 0.6.

Furthermore, a merit function based on the height histogram may be helpful to characterize the pronounced surface relief plateaus. A possible merit function M is the following:

$$M = \frac{d}{\sqrt{(\Delta x_1)^2 + (\Delta x_2)^2}}$$

The merit function M uses a relation of peak widths and relief modulation depth. The range of deviations of the top and bottom regions around their plateau should lie within a certain defined fraction of the relief modulation depth. $\Delta x_1$ and $\Delta x_2$ are the width of the two histogram peaks as measured at the height 1/e of the full peak height, wherein e is the base of the natural logarithm (e≈2.72), and d is the distance of the two peaks (which corresponds to the average plateau to plateau distance or the relief modulation depth). $\Delta x_1$, $\Delta x_2$ and d are indicated in FIG. 7.2.

Typically for the evaluation of such a height histogram a sampling width in the third dimension is chosen, which is at least 50 times smaller than the value of d, preferably at least 100 times smaller than the value of d.

Preferred embodiments of surface relief microstructures according to the invention have a merit function M, which is greater than two. More preferably, M is greater than 3.5.

The microstructure of FIGS. 7.1 and 7.2 for example has a merit function M of approximately 4.0.

The present invention furthermore relates to a method for making elements having surface relief microstructures as described above.

Generally, the method uses two major steps. In a first step, a mask is generated, which has a microstructure of first and second zones of different transparency, wherein at least in one lateral direction of the mask there is at least one transition from a first to a second zone or vice versa within every 20 micrometer, and wherein the lateral arrangement of the transitions is non-periodic.

In a second step, a surface of a resin or resist is relief microstructured with the help of the mask to produce top regions corresponding to the first zones of the mask and bottom regions corresponding to the second zones of the mask, wherein the top regions substantially lie in a top relief plateau and the bottom regions substantially lie in a bottom relief plateau, such that the relief modulation depth is substantially equal over the whole surface area.

Typically, the mask is a metal mask, which can be used for a structuring exposure process, such as a photolithographic or etching process.

Usually, one type of the first and second zones of the mask is fully transparent, for instance a hole in the mask, and the other type is non-transparent, for instance made of the opaque material of a metal mask. However, a skilled person will know that depending on the specific exposure process, also a mask with zones of different transparency (e.g. a half-tone mask or a grey scale mask) may be used.

The arrangement of the more transparent and less transparent zones of the mask will be isotropic for the making of isotropic surface relief microstructures, and anisotropic for the making of anisotropic surface relief microstructures.

In a preferred method to produce a mask for the use in the first step of the described method, the microstructure of first and second zones of different transparency is generated using technologies, which are already known for the making of topologically structured corrugated surface structures.

One such technology is based on phase-separation and crosslinking of a mixture of crosslinkable and non-crosslinkable materials. A topologically structured corrugated surface structure is obtainable by making a mixture of at least two materials of which at least one is crosslinkable and at least one other is non-crosslinkable, applying the mixture to a substrate, cross-linking at least a substantial portion of the crosslinkable material, and removing at least a substantial portion of the non-crosslinkable material. For microstructures, which shall be anisotropic, the crosslinkable material can be maintained in an oriented state, e.g. by means of an underlying orientation layer or an orientating substrate surface, during cross-linking.

More specifically, a topologically structured corrugated surface structure useful for producing a suitable mask may for instance be made in the following way. In a first step, a thin photo-alignment film, is coated on a suitable substrate. With the help of patterned linearly polarized UV light, for instance using one or more photomasks and repeated exposure (or single exposure with photomasks or polarizing masks leading to patterned irradiation in one step, or laser scanning methods etc.), a latent pattern or image is written into this thin photo-alignment film. A more detailed description of this photo-alignment technology can for example be found in U.S. Pat. No. 5,389,698. The exposed photopolymer has the ability to align liquid crystal mixtures and crosslinkable liquid crystal prepolymers. In a second step, the patterned alignment layer is coated with a blend of crosslinkable and non-crosslinkable liquid crystal materials. This liquid crystalline blend is then cross-linked, preferably by exposing it to actinic irradiation (UV light). The process induces a phase separation and cross-linking of the liquid crystal prepolymer. Subsequently, the non-cross-linked material is removed, for example using an adequate solvent, such that a corrugated thin-film with anisotropic surface structure results. The basic fabrication principles and the optical behavior of micro-corrugated thin-films are for example disclosed in the international patent applications WO-A-01/29148 and WO-A-2004/027500. With respect to the making of such corrugated thin-films with anisotropic surface structure, the disclosure of the documents WO-A-01/29148 and WO-A-2004/027500 is explicitly included herein.

Films with topologically structured corrugated surface structures generated for example by the described process can be used to produce the mask microstructure of first and second zones of different transparency. For this purpose, such a film is deposited on a layer of a mask material, for example chromium. Then, the thickness of the film is reduced, for instance through plasma etching, until the material of the film in the lower zones of the corrugated surface is cleared away and parts of the underlying mask material are set free. Finally, the freed parts of the mask are removed, for example by wet etching.

Besides the described method, other techniques can be used to produce a mask for the method according to the invention for making elements having surface relief microstructures.

Alternatively to the above described process to prepare a micro-corrugated thin-film there are also other self-assembly micro- and nanostructuring techniques known, which can be used. Amongst them are for example self organization in copolymer or dewetting A possible approach is to use an electron beam writer. The beam diameter of such writers leads to very narrow resist exposure areas and the positioning can be done even on a nanometer raster.

Further, electrolytically etching of metal or semiconductors, such as aluminium or silicon also lead to porous micro- and nanostructured surfaces, too.

Some examples further illustrating the invention will now be described.

In all examples, a metal mask is used for the mask having a microstructure of first and second zones of different transparency. The generation of such a mask acts as photolithographic mask or as dry etching mask.

EXAMPLE 1

FIGS. 8.1 to 8.5 illustrate the generation of a mask, which has a microstructure of first and second zones of different transparency that it is suitable for the method according to the invention for making elements having surface relief microstructures.

A glass or plastic plate 41, which is coated with a metal layer 42, serves as a substrate. For the metal layer, aluminium, chromium and alike metals with a coating thickness of 10 to 50 nanometers have been used advantageously.

On the metal layer 42, a film 43 with topologically structured corrugated surface structures is deposited (FIG. 8.2). The film 43 is made according to the procedure described above and disclosed in WO-A-01/29148 and WO-A-2004/027500. Locally, the microstructure can be isotropic or anisotropic. By means of patterned alignment, it is possible to inscribe images, graphical compositions, microtext and the like in the corrugated surface of the film.

The film 43 is then plasma etched such that part of the underlying metal film is set free (FIG. 8.3). This treatment can be done using standard oxygen plasma. As a result, the thickness of the film 43 is reduced until the metal layer 42 is partly covered only by the material of the upper zones 43' of the initial film 43.

In a next step, the partly freed metal layer 42 is wet etched using an adequate etch solution (FIG. 8.4). By this process, the metal layer 42 is provided with specifically microstructured holes 44 corresponding to the lower zones of the corrugated surface of the film 43. It thus builds a mask, which can be used in the method according to the invention for making elements having surface relief microstructures. If necessary, the residual material 43' of the film 43 on top of the remaining layer can be removed, for example by oxygen plasma (FIG. 8.5).

EXAMPLE 2

In FIGS. 9.1 to 9.3 it is illustrated how the microstructured mask of Example 1 in a next step is used to make an element having a surface area with an optically effective surface relief microstructure according to the invention.

A glass or plastic substrate 48 is coated with a layer 49 of a positive photoresist (FIG. 9.1). For example, the S1800 series photoresists of Shipley is very suitable. The thickness of the applied resist layer 49 determines the color, which is finally produced by the surface relief microstructure. Typical resist thicknesses are between 100 nanometers and 500 nanometers, but also thicker layers are possible. Depending on the type of resist, a baking, for instance for one minute at 110° C. on a hotplate, may be necessary.

Then, the prepared microstructured metal mask 42 on the plate 41 is squeezed against the photoresist layer 49 and exposed to an ultraviolet light source 50 (FIG. 9.2). For the light source, the ultraviolet equipment "Bluepoint 2" by Dr. Hönle, Germany, can for example be used.

The exposure time is adjusted in such a way that after development a good binary surface profile arises, that is, a profile with two pronounced surface relief plateaus 51 and 52 (FIG. 9.3).

It will be appreciated that instead of the positive photoresist also a negative photoresist could be used in a analogous process.

Good surface relief microstructures according to the invention have been obtained with this technique and fast fabrication is possible because the metal mask can be used many times and the photolithography steps including the development is a matter of a few minutes. The microstructures can be used as optical elements themselves, but preferably will be employed as a master in a replication technique.

In order to allow a qualitative overview comparison between a topologically structured corrugated surface structure according to the state-of-the-art, so according to WO-A-01/29148 and WO-A-2004/027500, with a structure as produced according to example 2, the optical properties of the above film 43, which corresponds to such a topologically structured corrugated surface structure according to the state-of-the-art, is compared with the final result of Example 2 as summarized in Table 1.

TABLE 1

| Property | Film 43 (according to state of the art) | Example 2 (according to invention) |
| --- | --- | --- |
| Color saturation | Normally no color; for specific, adapted structures, a weak pastel color possible | Saturated, deep color |
| Adjustability of color | Limited | Easily and effectively possible |
| Variability of color in different regions | Hardly possible | Possible |
| Image resolution | Good | Good |

EXAMPLE 3

Alternative to the method described in Example 2, other approaches have been tested. Good results can be obtained by directly coating a photoresist layer onto the metal mask with the appropriate film thickness.

In FIG. 10.1, again the prepared microstructured metal mask 42 on the plate 41 is shown, which this time is coated with a photoresist layer 55 as can be seen in FIG. 10.2. The UV exposure is made through the backside of the substrate with the microstructured metal mask on top.

In the next step, the photoresist development is carried out, such that the microstructured photoresist arises. Also in this case, a positive or a negative photoresist may be used for the photolithography process. FIG. 10.3 shows the resulting microstructured photoresist layer 55 with a positive resist, and FIG. 10.4 with a negative resist.

EXAMPLE 4

A further method of making an element having a surface area with an optically effective surface relief microstructure according to the invention is described with reference to FIGS. 11.1 and 11.2.

As a substrate, a glass plate 59 is coated with a layer 60 of an etchable material, e.g. a crosslinkable prepolymer. Alternatively, a polymer substrate, such as plexiglass, could be directly used without further coating.

Then, a microstructured metal mask 61 is generated on top of the substrate according to the method described in Example 1 (FIG. 11.1).

In the next step, the device is dry etched, such that plasma ions etch through the holes of the metal mask. Oxygen is a suitable plasma etch media. The etch selectivity of polymer and metal is very high. Therefore, even nanometer thick metal zones will not be attacked by the oxygen plasma and micro or nano grooves can be generated. The duration of the plasma etching determines the depth of the bottom regions and therefore the final color appearance. If glass is chosen as substrate, also the glass may act as stop material for the etching.

Finally, the metal mask is removed by wet etching with a suitable wet etching solution.

EXAMPLE 5

As mentioned before, elements having a surface area with an optically effective surface relief microstructure according to the invention can be used as master for a replication technique. For example, elements prepared according to the methods of Example 1 to 4 are suitable. After the preparation, the element may briefly be exposed to a wet etching bath in order to get rid of residual metal zones at the surface of the master.

The microstructured master is then ready for the generation of a metal shim. This is done by depositing a thin starting metal layer, for instance of gold, silver or the like, and subsequent galvanic deposition of nickel. The nickel shim is then used to make replica by hot embossing into suitable thin film polymer materials or by UV casting into suitable UV curable materials.

Further, the microstructured replica can be metal coated with aluminum or a similar material in order to produce a good reflecting surface. This will especially be the case if such a replica shall be applied as a security device.

Finally, the device may be protected with a dielectric passivation film or directly coated with a glue suitable for a subsequent application on a product. In this way, the surface modulations of the microstructure are filled with a dielectrical material.

Reflection devices based on the methods described above basically exhibit a monochrome reflection. Depending on the preparation, a color change may sometimes be observed as the sample is tilted. But one characteristic of these devices is that no rainbow colors are observed and that they thus are significantly distinct from standard holograms.

EXAMPLE 6

It is of course also possible to combine or intermix two or more areas with different surface relief microstructures in one element. Elements of this more complex type allow for example to generate multi-color images and because of their complexity may also have an increased level of security.

In FIGS. 12.1 to 12.4, an example of a method for making an element with two areas with different surface relief microstructures according to the invention is outlined.

On a substrate comprising a glass or plastic plate 65 and a layer 66 of an etchable material, a microstructured metal film 67 is coated according to the process steps described above (FIG. 12.1). Again, either a glass or plastic plate with a suitable polymer coating or a polymer plate such as PMMA (plexiglass) could be used.

Then, a first plasma etching is applied to the surface of the prepared substrate. The etch depth determines the first finally appearing color (FIG. 12.2).

Next, the so far generated surface relief microstructure is coated with a layer 68 of a positive photoresist and exposed to UV light in a certain area 69. By developing the photoresist, the exposed resist material in the area 69 is washed away (FIG. 12.3).

Now, the already existing microstructure in the area 68 can be further etched in a second etching step (FIG. 12.4). The additional etching step increases the depth and determines the color of the microstructure in the area 68. As a result, the element is provided with two areas 69 and 70 having different optically effective surface relief microstructures.

If desired, the described steps of covering some areas and etching the remaining free areas can be repeated to provide three and more areas with different microstructures.

The masks used can be accomplished with very high resolution holding pixel sizes well below 10 micrometers. A suitable choice of the color and pixel arrangement therefore also allows the generation of images based on additive color mixing.

EXAMPLE 7

Surface relief microstructures according to the invention may also be made reflective or partially reflective. Corresponding examples are illustrated in FIGS. 13.1 and 13.2.

For an intense color reflection, the microstructure will typically be coated with a thin layer 71 of a reflecting material such as aluminium, gold, chromium, copper or the like. The thickness of such a film 71 determines the degree of reflection and transmission such that high reflecting or partially reflecting devices can be obtained.

Instead of using a partially reflecting metal film for the layer 71 also a high or low index of refraction coating can be used. Examples of high index of refraction materials are ZnS, ZnSe, ITO or TiO2. Composite materials including nanoparticles of high index of refraction materials could also be suitable.

Alternatively, partially reflecting devices can also be obtained by coating the microstructure only partially with a high reflecting material, for instance by first coating the whole microstructure and then partially remove the coating again, such that only portions of the microstructures are covered with the reflecting material. This is indicated in FIG. 13.2, where the layer 71' of reflecting material is interrupted in certain portions 72.

Also shown in FIGS. 13.1 and 13.2 are protection and passivation films 73, which for example are transparent dielectric materials or materials with a specific absorption behavior in order to further enhance the color appearance of the device.

EXAMPLE 8

To demonstrate the optical behavior of surface relief microstructures according to the invention, in FIGS. 14.1 and 14.2 reflection spectra of an example element are shown. The element was made according to the method of Example 4 (etching through the microstructured metal mask) including a final thin film aluminium coating of about 20 nanometer and measured through a transparent passivation film of index of refraction of about 1.5.

The optical behavior is best characterized by the non-specular scattering reflection color of the element, which in this case is green.

The various produced example elements were characterized by taking reflection spectra at various illumination and detector angles. The used photospectrometer was a Perkin Elmer Lambda 900 equipped with a Pela 1030 option that allows to measure reflection spectra with adjustable sample angle and adjustable detector angle. Typical reflection spectra were measured for the wavelength range between 300 and 800 nanometers. No special polarization equipment was used for the described measurements. An exceptional illumination and detector condition exists for the discussed specular reflection, which corresponds to the case of mirror reflection geometry (input angle equal output angle or detector angle equals twice the sample angle).

Reflection spectra of the example element are given in FIG. 14.1. The illumination or sample angle SA is 30°. This angle is the angle deviation from the substrate surface to the illumination normal plane as indicated in the upper left insert of the figure. The detector angle DA is the angle between the illumination direction and the detector direction as also indicated in the upper left insert.

The reflection spectra show the strong reflection maxima at 525 nanometers, another maxima at 350 nanometers and a minima at 400 nanometers. These pronounced maxima and minima are responsible for the good color saturation of the reflected light. The maximum reflection is achieved at a detector angle of 40°, which is 20° away from the specular reflection. For detector angles of 30° and 50°, a decrease in the reflected light intensity is seen, and the accompanied wavelength shifts are not very large in this case.

The specular reflection light differs from the non-specular reflection. The specular reflection appears as a saturated magenta. Corresponding reflection spectra are shown in FIG. 14.2. In the case of specular measurements, the detector angle DA is twice the sample angle SA. Again a pronounced modulation is seen in the chart, which nearly corresponds to the complementary spectra of the scattering reflection seen in FIG. 14.1. This can be understood by noting that the largest portion of scattering taking place is given in the measurement of FIG. 14.1. If no major color sensitive scattering or absorption channels are present, the complementary spectra are left over for the specular reflection. The background of about 4% corresponds to the achromatic reflection at the protective, passivation layer of the device, which is glass in the present case. As seen in FIG. 14.2, the color spectra of specular light are also quite insensitive to tilting of the device.

EXAMPLE 9

FIGS. 15.1 and 15.2 show reflection spectra of another example of an element according to the invention. The element was made according to the method of Example 4. Its scattering color is orange.

Referring to FIG. 15.1, the illumination or sample angle SA is 30°. The reflection spectra show the strong reflection maxima at 583 nanometers, another maxima at 380 nanometers and a minima at 453 nanometers. These maxima and minima are responsible for the bright orange reflected light. The maximum reflection is achieved at a detector angle DA of 40° which is 20° away from the specular reflection. For a detector angle of 50°, a decrease in reflected light intensity is observed and the accompanied wavelength shift is about 30 nanometer.

The specular reflection of the same example element is shown in FIG. 15.2. Again a pronounced modulation is seen, which nearly corresponds to the complementary spectra of the scattering reflection seen in FIG. 15.1. The minimum at 586 nanometers is however not very pronounced which means the saturation of the reflected light is not very high. The visually perceived device color is an unsaturated blue.

What is claimed is:

1. Method for making an element having at least one surface area with a surface relief micro-structure, which method comprises:
   creating a mask with a microstructure of first and second zones of different transparency, by including the steps:
      depositing on a layer of a mask material a film with a topologically structured corrugated surface structure;
      reducing the thickness of the film until the material of the film in lower zones of the corrugated surface is cleared away and parts of the underlying mask material are set free; and
      removing the parts of the mask that are set free,
   wherein at least in a first lateral direction of the mask there is, in average, at least one transition from a first to a second zone or vice versa within every 20 micrometers, and wherein in the first lateral direction the lateral arrangement of the transitions is non-periodic;
   generating with the help of the mask a relief microstructure in the surface of a resin or resist to produce top regions corresponding to the first zones of the mask and bottom regions corresponding to the second zones of the mask, wherein the top regions substantially lie in a top relief plateau and the bottom regions substantially lie in a bottom relief plateau, such that the relief modulation depth is substantially equal over the whole surface area.

2. Method according to claim 1, wherein the topologically structured corrugated surface structure is made by making a mixture of at least two materials of which at least one is crosslinkable and at least one other is non-crosslinkable, applying the mixture to the layer of the mask material, cross-linking at least a substantial portion of the crosslinkable material, and removing at least a substantial portion of the non-crosslinkable material.

3. Method according to claim 2, wherein the crosslinkable material is maintained in an oriented state during cross-linking.

4. Method according to claim 1, wherein in a second lateral direction of the mask, which is perpendicular to the first direction, there is in average at least one transition from a first to a second zone or vice versa within every 200 micro-meters.

5. Method according to claim 1, wherein the element is a security element.

6. Method according to claim 1, further comprising a step of coating the relief microstructure with a reflecting material after the relief microstructure is generated.

7. Method according to claim 6, wherein the reflecting material is aluminum, gold, chromium, or copper.

\* \* \* \* \*